No. 872,170.
PATENTED NOV. 26, 1907.
H. P. COSTER.
AUTOMATIC CUT-OFF.
APPLICATION FILED MAY 16, 1907.
2 SHEETS—SHEET 1.
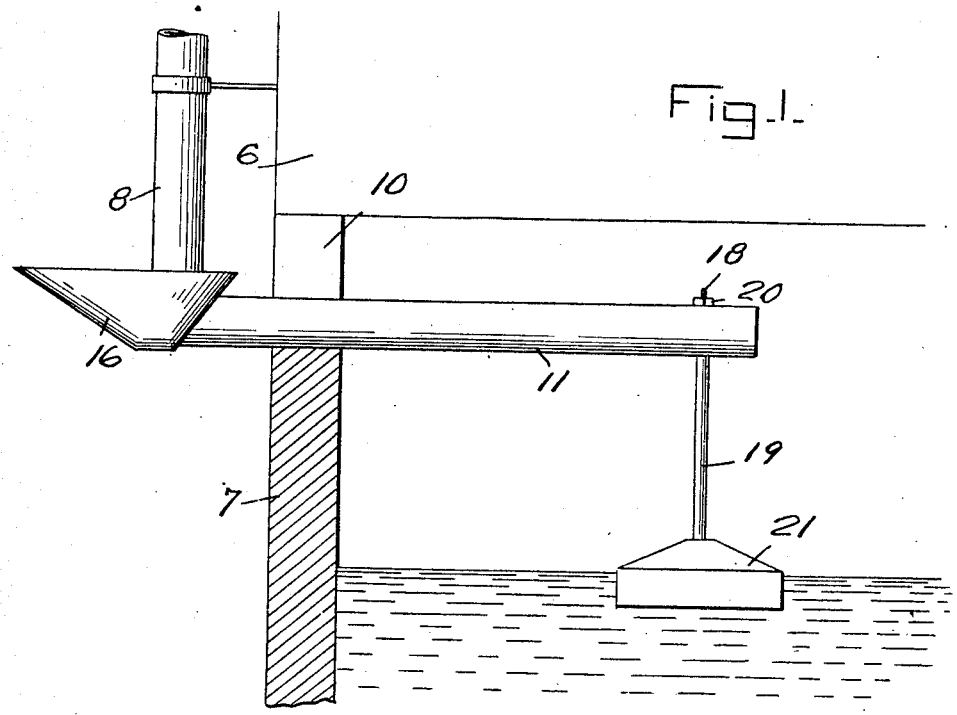
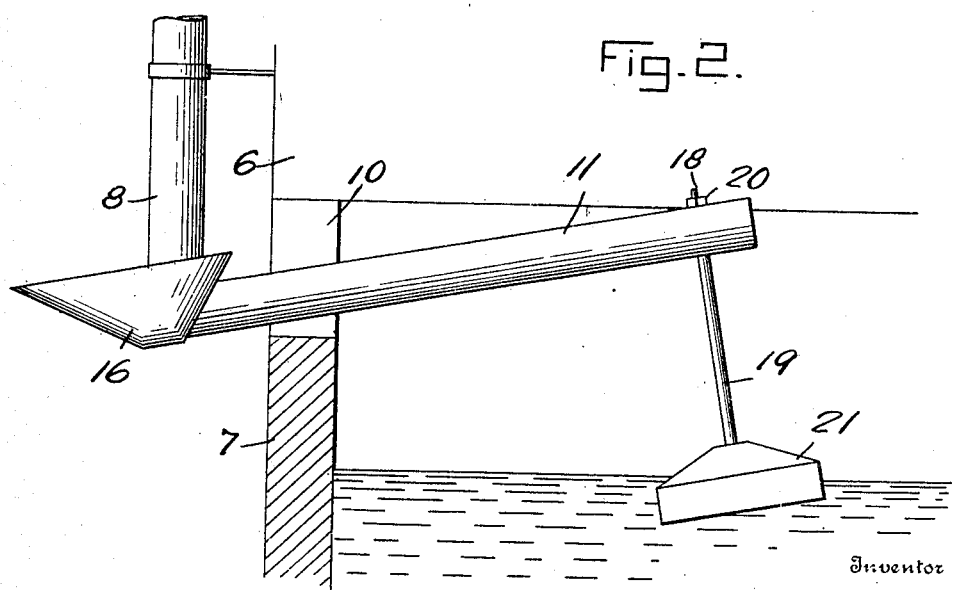
Witnesses
G. R. Thomas
F. G. Smith
Inventor
Henry P. Coster
By Chandlee & Chandlee
Attorneys

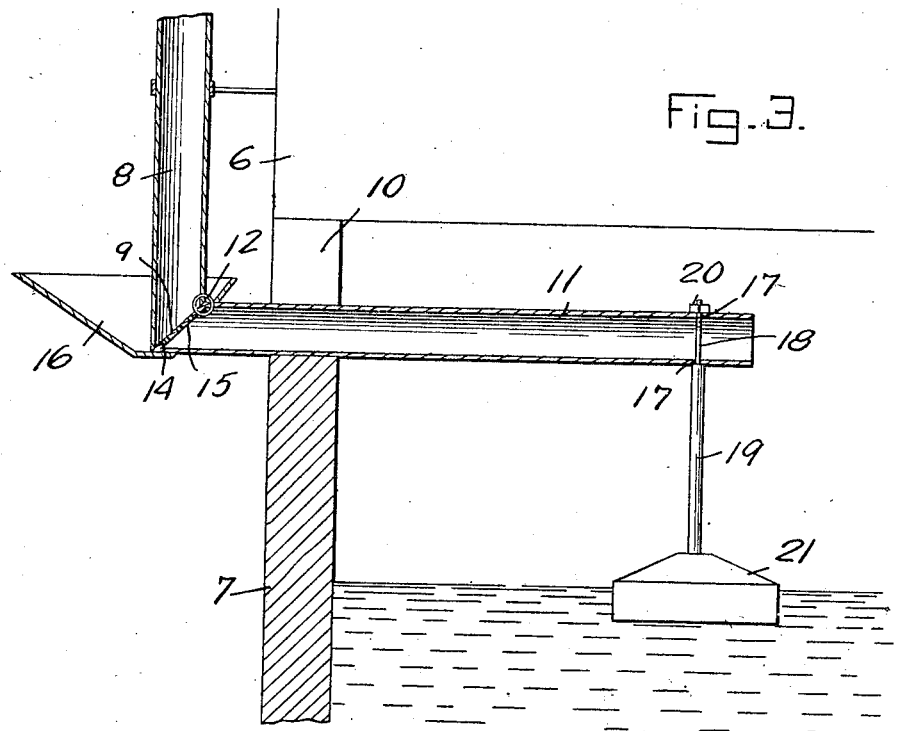

UNITED STATES PATENT OFFICE.

HENRY P. COSTER, OF SHABBONA, ILLINOIS.

AUTOMATIC CUT-OFF.

No. 872,170. Specification of Letters Patent. Patented Nov. 26, 1907.

Application filed May 16, 1907. Serial No. 373,952.

*To all whom it may concern:*

Be it known that I, HENRY P. COSTER, a citizen of the United States, residing at Shabbona, in the county of Dekalb, State of Illinois, have invented certain new and useful Improvements in Automatic Cut-Offs; and I do hereby declare the following to be a full, clear, and exact description of the invention, such as will enable others skilled in the art to which it appertains to make and use the same.

This invention relates to automatic cut-offs for cisterns and the primary object of the invention is to provide means whereby when a cistern has become filled with rain water, any subsequent precipitation which would normally flow into the cistern, will be cut off.

It is the object of my invention furthermore to avoid the use of valves in a device of this class, the pipe leading into the cistern being tiltable and controlled by a float within the cistern so that water discharged into the pipe, when the cistern is full and the pipe is raised, will not flow through the pipe but will be discharged to the ground.

In the accompanying drawings, Figure 1 is a side elevation of the invention as applied to a cistern, the pipe leading into the cistern being shown in lowered position. Fig. 2 is a similar view, the pipe however being shown in raised position, Fig. 3 is a vertical sectional view through the device in the position shown in Fig. 1, Fig. 4 is a similar view in the position shown in Fig. 2, and, Fig. 5 is a front end elevation of the pipe which leads into the cistern.

In the drawings there is shown the side of a house indicated by the numeral 6 and the corresponding wall 7 of a cistern.

The numeral 8 denotes the discharge pipe from the eaves trough of the house roof (not shown) and this pipe leads downwardly and has its upper end terminating in a plane slightly below the plane occupied by the upper edge of the wall 7, the said lower end of the pipe being cut diagonally as indicated by the numeral 9 and being left open.

An opening 10 is formed through the wall 7 of the cistern and through this opening projects a pipe 11 which leads into the cistern and has its upper end extending beyond the wall 7 of the cistern and normally coincident and flush with the diagonally cut lower end of the pipe 8. The pipe 11 is hingedly connected with the lower end of the pipe 8 by means of a ring 12 which is passed through the inner meeting edges of the two pipes. The pipe 11 is in this manner mounted for vertical swinging movement. The said outer end of the pipe 11 is cut diagonally as indicated at 14 and in the same manner and to the same degree as the lower end of the pipe 8 and fitted over the said end of the pipe 11 is a foraminous plate 15 which serves to strain the rain water discharged from the pipe 8 and prevent entrance of twigs, leaves, etc., through the pipe 11 and into the cistern. Secured to the said outer end of the pipe 11 is a funnel shaped receptacle 16 into which the lower end of the pipe 8 of course projects. This funnel shaped receptacle has its forward side extended forwardly to a greater degree than the rear side is extended rearwardly or in other words the pipe 8 is located at a greater distance from the forward side of the said funnel shaped receptacle than from the rear side thereof and the purpose of this construction will presently be made apparent. Adjacent its inner end, the pipe 11 is provided with openings 17 which are in vertical alinement and through these openings is engaged the reduced upper end 18 of a rod 19, there being a nut 20 engaged upon that portion of the said reduced upper end of the rod which projects above the pipe 11 so as to hold the rod in fixed relation with respect to the said pipe. Fixed to the lower end of the rod is a float 21 the upper end of which is conical in form to prevent lodging of dirt thereon.

From the foregoing description of my invention it will be observed that under normal conditions and as hereinbefore stated, the lower end of the pipe 8 and the outer end of the pipe 11 register and rain water is delivered from the eaves trough through the pipe 8, the pipe 11, and into the cistern. When, however, the water rises in the cistern or rather when the cistern has become nearly filled with water the float will rise with the water and will swing the pipe 11 vertically thus moving the outer end of the said pipe away from the lower end of the pipe 8 as clearly shown in Figs. 2 and 4 of the drawings and at the same time tilting the funnel shaped receptacle. The inner end of the pipe 11 is of course elevated to a point considerably above the extreme upper edge of the funnel shaped receptacle 16 and consequently when the pipe is thus tilted, any rain water discharged into the said receptacle will either remain therein or overflow but will not enter the pipe 11. Consumption of the water in the cistern will of course result in a lowering of the float and this lowering of the float will serve to restore the pipe 11 to its normal horizontal position and the cistern will again receive water discharge through the pipe 8.

What is claimed is—

1. The combination with a cistern and a pipe for conducting rain water, the said pipe having its lower end cut diagonally, of a pipe extended through one wall of the cistern and hinged to the first mentioned pipe for vertical swinging movement, the outer end of the pipe being cut diagonally to normally register with the diagonally cut lower end of the first mentioned pipe, a foraminous sheet fixed over the diagonally cut outer end of the last mentioned pipe, a receptacle connected with the said end of the pipe and into which the lower end portion of the first mentioned pipe extends, and a float connected with the second mentioned pipe within the cistern and adjacent the inner end of the said second named pipe.

2. The combination with a cistern and a pipe for conducting rain water, said pipe having its lower end cut diagonally, and the said cistern having one of its walls provided with an opening, of a pipe extended through the opening in the said wall of the cistern and hinged at its end to the first mentioned pipe for vertical swinging movement, the outer end of the said pipe being cut diagonally to register with the lower end of the said first mentioned pipe, a foraminous sheet fixed across the diagonally cut end of the second mentioned pipe, a funnel shaped receptacle connected with the said end of the second mentioned pipe and having its forward portion extended, the said second named pipe being provided with vertically alined openings adjacent its rear end, a rod having a reduced upper end portion engaged through said openings, a nut engaged upon the upper end of the reduced upper end portion of the rod and serving to fix the same with relation to the pipe, and a float carried at the lower end of the rod, said float having a conical upper end.

In testimony whereof, I affix my signature, in presence of two witnesses.

HENRY P. COSTER.

Witnesses:
G. W. JACKSON,
F. W. LANE.